(12) United States Patent
Laine et al.

(10) Patent No.: US 10,974,705 B2
(45) Date of Patent: Apr. 13, 2021

(54) WHEEL CONTROLLER FOR A VEHICLE

(71) Applicant: Volvo Truck Corporation, Gothenburg (SE)

(72) Inventors: Leo Laine, Gothenburg (SE); Leon Henderson, Gothenburg (SE); Mats Sabelström, Billdal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 117 days.

(21) Appl. No.: 16/310,100

(22) PCT Filed: Jun. 15, 2016

(86) PCT No.: PCT/EP2016/063782
§ 371 (c)(1),
(2) Date: Dec. 14, 2018

(87) PCT Pub. No.: WO2017/215751
PCT Pub. Date: Dec. 21, 2017

(65) Prior Publication Data
US 2019/0176784 A1    Jun. 13, 2019

(51) Int. Cl.
*B60T 8/17* (2006.01)
*B60T 8/172* (2006.01)
*B60T 8/1761* (2006.01)

(52) U.S. Cl.
CPC ............ *B60T 8/1708* (2013.01); *B60T 8/172* (2013.01); *B60T 8/17616* (2013.01); *B60T 2270/86* (2013.01)

(58) Field of Classification Search
CPC .... B60T 8/1708; B60T 8/172; B60T 8/17616; B60T 2270/86
See application file for complete search history.

(56) References Cited

U.S. PATENT DOCUMENTS 6,256,570 B1    7/2001 Weiberle et al.
7,099,795 B1 *  8/2006 Gerstenmeier ......... B60T 8/171
                                                    702/148

(Continued)

FOREIGN PATENT DOCUMENTS

CN    105121237 A    12/2015
DE     19653262 A1    6/1998

(Continued)

OTHER PUBLICATIONS

International Preliminary Report on Patentability for PCT/EP2016/063782, dated Sep. 3, 2018, 6 pages.

(Continued)

*Primary Examiner* — Michael J Zanelli
(74) *Attorney, Agent, or Firm* — Withrow & Terranova PLLC

(57) ABSTRACT

The present invention relates to a wheel controller (108) for a vehicle (100), comprising a wheel slip calculation module (212) arranged to calculate a longitudinal wheel slip value for a wheel slip between a surface of the wheel (102) and a road surface thereof; a wheel force estimation module (214) arranged to estimate a longitudinal wheel force value for a wheel force between the surface of the wheel (102) and the road surface; a tire model generator (216) arranged to receive longitudinal wheel slip values from the wheel slip calculation module (212) and longitudinal wheel force values from the wheel force estimation module (214); said tire model generator (216) being configured to generate a model (300, 400) representing a relationship between the calculated longitudinal wheel slip and the estimated longitudinal wheel force by using at least three longitudinal wheel force values and three corresponding longitudinal wheel slip values; and a vehicle wheel capability module (218) arranged in communication with the tire model generator (216), said vehicle wheel capability module (218) being configured to (Continued)

determine an absolute maximum wheel friction level between the surface of the wheel (102) and the road surface thereof by means of acquiring, for a calculated wheel slip value, a longitudinal wheel force value from the model (300, 400) of the tire model generator.

17 Claims, 5 Drawing Sheets

(56) References Cited

U.S. PATENT DOCUMENTS

| | | | |
|---|---|---|---|
| 8,707,756 B2* | 4/2014 | Shiozawa | B60W 40/068 73/9 |
| 2005/0001472 A1 | 1/2005 | Bale et al. | |
| 2005/0165531 A1 | 7/2005 | Nilsson et al. | |
| 2005/0187672 A1 | 8/2005 | Fangeat et al. | |
| 2005/0234628 A1* | 10/2005 | Luders | B60T 8/1725 701/80 |
| 2006/0253243 A1 | 11/2006 | Svendenius et al. | |
| 2012/0150362 A1* | 6/2012 | Kolbe | B60T 13/74 701/2 |
| 2014/0200787 A1* | 7/2014 | Takahashi | B60T 8/1755 701/83 |

FOREIGN PATENT DOCUMENTS

| | | |
|---|---|---|
| EP | 1719676 A1 | 11/2006 |
| JP | H04224447 A | 8/1992 |
| JP | 2000506818 A | 6/2000 |
| JP | 2000313246 A | 11/2000 |
| JP | 2001130391 A | 5/2001 |
| JP | 2001253334 A | 9/2001 |
| JP | 2005047313 A | 2/2005 |
| JP | 2007196705 A | 8/2007 |
| JP | 2008061422 A | 3/2008 |
| JP | 2010-74988 * | 4/2010 |
| WO | 03074337 A1 | 9/2003 |
| WO | WO2004/091988 A1 * | 10/2004 |

OTHER PUBLICATIONS

International Search Report and Written Opinion for PCT/EP2016/063782, dated Feb. 16, 2017, 8 pages.

Office Action for Japanese Patent Application No. 2018-565709, dated Jul. 3, 2020, 19 pages.

First Office Action for Chinese Patent Application No. 201680086735.8, dated Nov. 24, 2020, 18 pages.

* cited by examiner

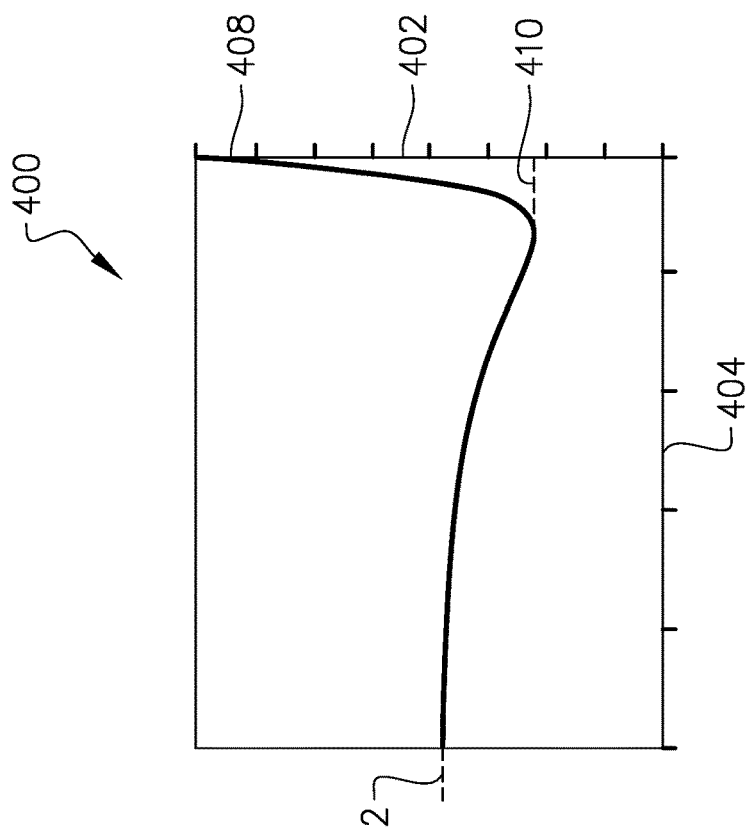
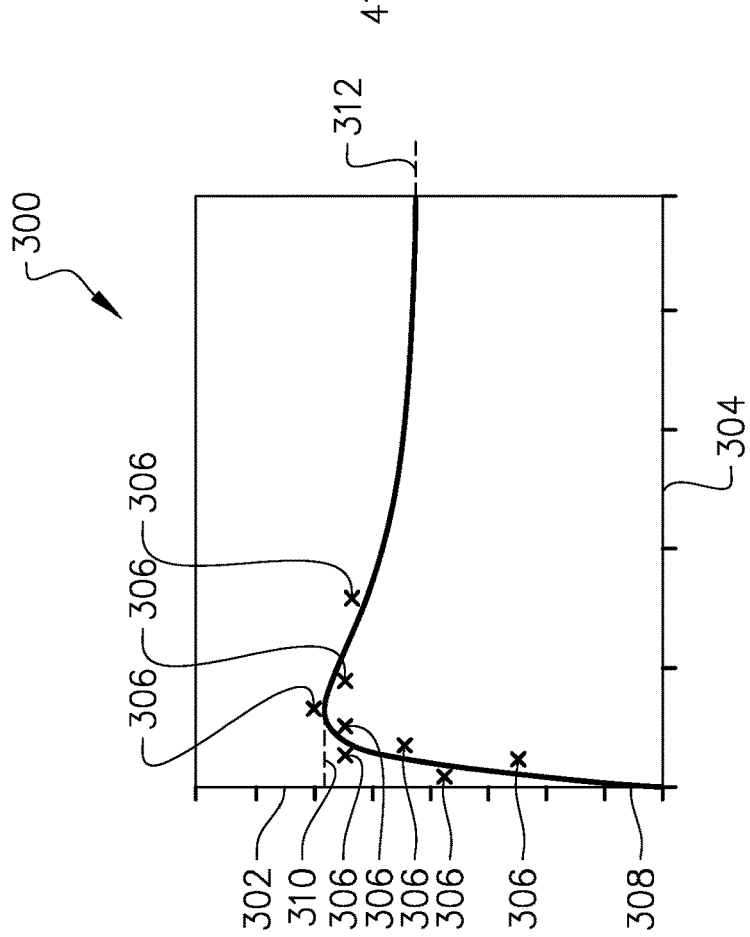
FIG. 4
FIG. 3

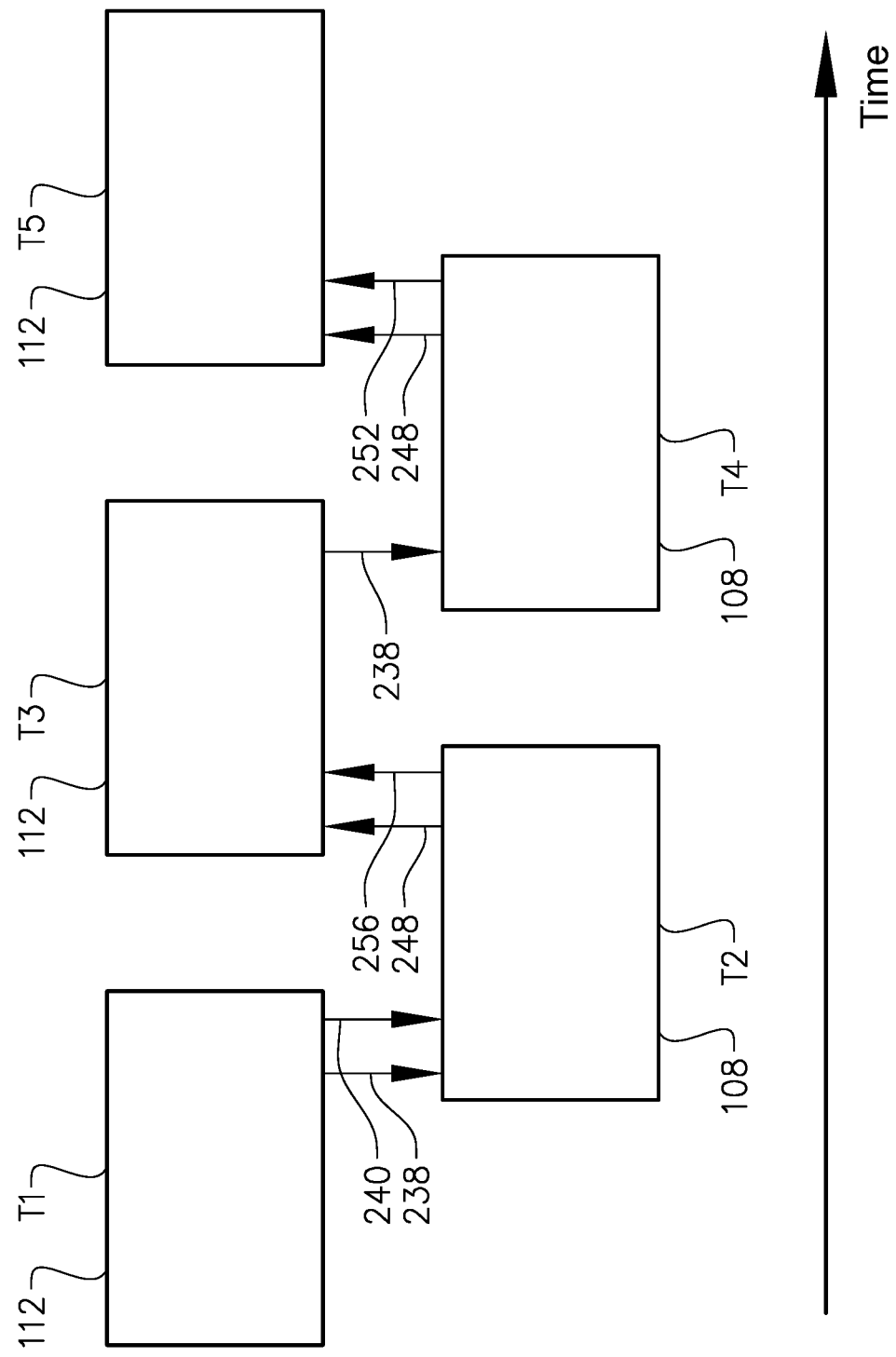

WHEEL CONTROLLER FOR A VEHICLE

This application is a 35 USC 371 National Phase filing of International Application No. PCT/EP2016/063782, filed Jun. 15, 2016, the disclosure of which is incorporated herein by reference in its entirety.

TECHNICAL FIELD

The present invention relates to a wheel controller for a vehicle. The invention also relates to a method for controlling a wheel of a vehicle by means of a wheel controller. The invention is applicable on vehicles, in particularly low, medium and heavy duty vehicles commonly referred to as trucks. Although the invention will mainly be described in relation to a truck, it may also be applicable for other type of vehicles such as e.g. buses, working machines, cars, etc.

BACKGROUND

In the field of vehicle, in particularly low-, medium- and heavy duty vehicles commonly referred to as trucks, it is known to utilize an electronic braking system or an electronic propulsion system. In the latter case, the electronic propulsion system may be an individual propulsion system arranged in connection to the respective propelled wheels of the vehicle. These systems are often controlled by a centralized control system of the vehicle such that control signals relating to e.g. desired brake torque and/or desired propulsion is provided from the centralized control system to the respective brake/propulsion system. The centralized control system is arranged to receive and evaluate parameter values used when setting the desired brake torque and/or the desired electric propulsion for the wheels.

However, the state of the art has room for improvements when it comes to determining a torque level and/or propulsion level for the respective wheel brake and/or electric propulsion system. It is thus desirable to be able to more accurately determine the capability of the wheel brake and/or electric propulsion system, i.e. how much torque the wheel brake is able to absorb and/or how much propulsion the electric propulsion system is able to provide.

SUMMARY

It is an object of the present invention to provide a wheel controller which at least partially overcomes the deficiencies of the prior art. This is achieved by a wheel controller.

According to a first aspect of the present invention, there is provided a wheel controller for a vehicle, comprising a wheel slip calculation module arranged to calculate a longitudinal wheel slip value for a wheel slip between a surface of the wheel and a road surface thereof; a wheel force estimation module arranged to estimate a longitudinal wheel force value for a wheel force between the surface of the wheel and the road surface; a tire model generator arranged to receive longitudinal wheel slip values from the wheel slip calculation module and longitudinal wheel force values from the wheel force estimation module; the tire model generator being configured to generate a model representing a relationship between the calculated longitudinal wheel slip and the estimated longitudinal wheel force by using at least three longitudinal wheel force values and three corresponding longitudinal wheel slip values; and a vehicle wheel capability module arranged in communication with the tire model generator, the vehicle wheel capability module being configured to determine an absolute maximum wheel friction level between the surface of the wheel and the road surface thereof by means of acquiring, for a calculated wheel slip value, a longitudinal wheel force value from the model of the tire model generator.

The wording "longitudinal wheel slip" should be understood to mean the relative longitudinal motion between the wheel of the vehicle and the ground surface thereof, i.e. the amount of "skidding". The longitudinal wheel slip can be determined as a relation between the surface speed of the wheel compared to the speed between a wheel axle and the road surface. The wheel slip calculation module may receive wheel speed values from e.g. a wheel speed sensor to be able to calculate the longitudinal wheel slip for the wheel of the vehicle.

Further, the "longitudinal wheel force" should be understood to mean a friction force (in the longitudinal direction) between the surface of the wheel and the road surface thereof. This friction force may be an estimated friction force, which is estimated based on e.g. an estimation model, such as a state observer which receives input relating to e.g. brake torque, brake pressure, wheel speed, etc.

By means of the received values relating to wheel slip and estimated friction forces between the surface of the wheel and the road surface thereof, a relationship between these wheel specific variables can be determined. Although the above description states that at least three wheel slip values and three corresponding wheel friction values are used, it may be desirable to use further measurement/estimation values to further increase the accuracy of the model representing the described relationship.

An advantage of the present invention is that the capability of the wheel can be determined. Hence, when the wheel controller is used for a vehicle wheel brake as will be described further below, the present invention can determine the current capability of the wheel brake, i.e. how much brake torque the wheel brake is able to sustain. When relating to an electric propulsion system, the present invention is able to determine a capability for the electric propulsion system, i.e. how much propulsion torque the electric propulsion system/engine is able to provide. For both the vehicle wheel brake and the electric propulsion system, the wheel capability is thus determined by means of determining a maximum wheel friction between the surface of the wheel and the road surface for a currently detected/calculated wheel slip value.

Furthermore, since the wheel controller is arranged to determine an absolute maximum wheel friction level for a respective wheel of the vehicle, it is possible to improve the overall vehicle stability since the dynamics may be different for the various wheels. This may be taken into account when determining the capability of the respective wheels. Furthermore, by means of the model representing the relationship between the calculated longitudinal wheel slip and the estimated longitudinal wheel force, other tire parameters, such as e.g. slip stiffness of the wheel, can be obtained. Hereby, an up-to-date model of the vehicle can be provided for predicting vehicle performance as well as to optimize allocation of demands between different wheels and corresponding actuators.

According to an example embodiment, the wheel controller may further comprise a control unit arranged to receive a signal from the tire model generator and/or the vehicle wheel capability module, wherein the control unit is arranged in communication with a vehicle motion management controller of the vehicle for communication of the signals thereto.

Hereby, the wheel controller is able to communicate with other vehicle controllers of the vehicle. Hence, the wheel controller is able to provide information to e.g. a centralized motion management system of the vehicle, which information can relate to the vehicle wheel capability, etc. The wheel controller may provide tire parameters, such as e.g. slip stiffness, to the centralized motion management system which may use these parameters in conjunction with a computer model of the complete vehicle. Hereby, an improved prediction of how the vehicle will respond to e.g. braking, propulsion and steering requests is provided. This may in turn be used by the centralized motion management system when allocating demands of the different actuators. A further parameter that can be provided to the centralized motion management system is a parameter relating to a time period until the wheel brake or wheel propulsion device, as will be described further below, is estimated to be overheated. Hereby, the centralized motion management system can predict how the performance of the vehicle will degrade over time, which information may also be used when allocating demands on the actuators.

According to an example embodiment, the model representing the relationship between the calculated longitudinal wheel slip and the estimated longitudinal wheel force may comprise a longitudinal wheel slip stiffness measured at zero slip between the wheel surface and the road surface, an absolute maximum wheel friction level, and a wheel friction level corresponding to a maximum wheel slip level.

The model is advantageous as it represents the friction conditions present between the wheel and the road surface, as well as mechanical properties of the wheel itself. Thus, if the friction condition changes, the maximum wheel friction level and the wheel friction level at maximum slip is changed, while the longitudinal wheel slip stiffness measured at zero slip is dependent on the mechanical properties of the wheel. An advantage is thus that a model is provided which adapts to current friction condition as well as vehicle wheel model/properties, i.e. an up-to-date model for determining the wheel capability is provided.

According to an example embodiment, the wheel controller may be a decentralized wheel controller arranged in connection to one of the wheels of the vehicle.

Using a decentralized wheel controller is advantageous as it is connected in direct communication with the respective wheel of the vehicle. Hereby, the wheel controller has direct control of the respective wheel of the vehicle. There are several advantages of providing the wheel controller in direct communication with the respective wheel. An overall advantage is that all computational tasks and estimations are executed by the decentralized wheel controller, which enables for faster calculations and estimations. A reduction of at least 10% in computational sampling time is possible for a decentralized computation in comparison to the computational sampling time of a central, global system. Hence, calculation of longitudinal wheel slip and estimation of the longitudinal wheel force for the specific wheel arranged in connection to the decentralized wheel controller can be executed relatively expedient and with low latency since e.g. the sensor signal will be directly available for the decentralized wheel controller. This is especially beneficial in relation to a wheel brake since it can improve the braking performance of the brake by e.g. reducing the stopping distance.

Furthermore, the accuracy of the respective calculated/estimated parameters will be improved by using the decentralized wheel controller. For example, measuring the longitudinal wheel velocity by means of the decentralized wheel controller is beneficial as it will provide an improved accuracy when calculating longitudinal wheel slip for the respective wheel. This can be the case when e.g. turning left/right during driving, as the wheels then have different longitudinal wheel speed in comparison to each other. Also, as the decentralized wheel controller is in direct communication with the respective wheels of the vehicle, a direct control of e.g. the respective wheel brake and/or wheel propulsion system is provided.

Moreover, when the decentralized wheel controller is a decentralized wheel brake controller, as is described below, the decentralized wheel brake controller can report a presently available wheel brake capability for the specific wheel brake. Hereby, an improved coordinated control of all the wheel brakes can be provided. This is advantageous since it can provide for improved low speed maneuverability, improved stability control and roll stability control of the vehicle, improved traction control, active differential control etc.

Still further, the modularity of the braking system is improved as it can be easily expandable to more (or less) axles by means of simply adding a further decentralized wheel controller to the wheel of interest, etc. The decentralized controller is also independent of the specifics of the wheel it is connected to and can hence also be connected to e.g. a wheel of a dolly, or a trailer, etc.

According to an example embodiment, the wheel controller may be a wheel brake controller and the vehicle wheel capability module may be a wheel brake capability module arranged to determine the capability of the wheel brake.

Hereby, and as described above, the wheel brake controller is able to determine how much brake torque the wheel brake is able to sustain. Further, providing a wheel brake controller locally at the respective wheel brake enables for relatively fast calculations/estimations when determining the capability of the wheel brake, since the local/decentralized wheel brake controller is arranged in close proximity to the wheel brake it is intended to control.

According to an example embodiment, the wheel controller may be a wheel propulsion controller and the wheel capability module may be a wheel propulsion capability module arranged to determine the capability of the wheel propulsion device.

Hereby, a wheel propulsion device such as e.g. an electric motor connected to the respective wheel of the vehicle can be controlled by a local/decentralized wheel propulsion controller. Thus, the local/decentralized wheel propulsion controller is able to determine e.g. how much torque the electric propulsion system/engine is able to provide to the wheel it is connected to.

According to an example embodiment, the wheel controller may further comprise a wheel speed sensor arranged to measure a speed of the wheel.

Hereby, the wheel speed is measured and translated to the specific wheel, i.e. a wheel speed is determined which corresponds to the speed at the specific wheel. The wheel speed at the specific wheel can then be used when calculating the true wheel slip at the specific wheel. This is especially advantageous when driving around corners etc.

The wheel speed sensor is thus arranged to measure/detect the longitudinal wheel speed of the wheel arranged in connection to the wheel controller.

According to an example embodiment, the wheel controller may further comprise a brake temperature sensor arranged to measure a temperature of the wheel brake.

Measuring the temperature of the wheel brake is advantageous as it provides for a further parameter when determining the capability of the wheel brake. By measuring the wheel brake temperature, the wheel controller can estimate an amount of brake fade due to hot brakes etc. The wheel controller can then determine a brake gain for the specific brake, which brake gain is a ratio of the brake torque generated from the brake pressure applied. Further advantages of providing a brake temperature sensor to the wheel controller is given below.

According to an example embodiment, the wheel controller may further comprise a brake wear sensor arranged to measure a current wear value of the wheel brake.

Hereby, a further parameter for determining the wheel brake capability can be received from the brake wear sensor.

According to an example embodiment, the wheel controller may further comprise a brake pressure sensor arranged to measure a current brake pressure of the wheel brake.

An advantage of providing a brake pressure sensor is that data relating to the amount pressure applied to the wheel brake can be determined/measured.

According to an example embodiment, the vehicle wheel capability module may be further arranged to determine a time period until the wheel brake is overheated.

Hereby, the wheel controller comprises intelligence for determining when the wheel brake will be overheated. Input in terms of temperature values is thus received from the brake temperature sensor for determining a present wheel brake temperature. The wheel controller then determines for how long time period ahead the wheel brake can sustain such temperature level until being overheated. Determining the time period until the wheel brake is overheated provides for a further parameter when determining the capability of the wheel brake.

According to an example embodiment, the vehicle wheel capability module may be further arranged to determine a time period until the wheel propulsion device is overheated.

Hence, temperature values from a temperature sensor arranged in connection to the wheel propulsion device may measure/detect a temperature level of the wheel propulsion device which can be used when determining the capability of the wheel propulsion device.

According to an example embodiment, the vehicle wheel capability module may be further arranged to receive a current wear value of the wheel brake from the brake wear sensor and to use the current wear value when determining the capability of the wheel brake.

As described above, a further parameter for determining the wheel brake capability can be received from the brake wear sensor.

According to an example embodiment, the wheel controller may further comprise a wheel brake torque control module, the wheel brake torque control module being arranged to receive a signal indicative of a brake torque demand and to determine, based on the received signal, a brake pressure demand.

Hereby, the wheel controller is able to receive input from e.g. a centralized vehicle control system, which input relates to a desired brake torque from an operator of the vehicle. The wheel controller may thus determine the amount brake pressure needed to fulfil this desired brake torque from the operator. The operator should be understood to include both a physical driver of the vehicle as well as a computer controller as the invention is applicable also for autonomous vehicles, or for a stability controller, etc.

According to an example embodiment, the wheel brake torque control module may be further configured to receive a signal indicative of a brake temperature level of the wheel brake, wherein the brake temperature level is used as input when determining the brake pressure demand.

An advantage is that the wheel brake torque control module is able to receive a temperature level of the wheel brake and determine how the wheel brake is affected by this temperature level. The brake pressure demand may thus be adjusted based on the brake temperature so that the desired brake torque from the operator can be fulfilled.

According to an example embodiment, the signal indicative of a brake temperature level of the wheel brake may be an estimated brake temperature or a brake temperature value received from a brake temperature sensor.

The estimation of a brake temperature may, for example, be made by using the magnitude and duration of one or a plurality of previous braking events. Also, a model of thermal properties of the brake may also be used when estimating the brake temperature.

According to an example embodiment, the wheel controller may further comprise a wheel slip control module, the wheel slip control module being arranged to receive a maximum allowable wheel slip value for the wheel and to control the wheel slip of the wheel not to exceed the maximum allowable wheel slip value.

An advantage is that the wheel will be controlled to not slip more than allowable which will improve the wheel performance. The maximum allowable wheel slip may be different for the different wheels of the vehicle and the wheel slip value may change depending on e.g. the road condition, the type of maneuver being carried out, if the wheel is connected to a steered or non-steered axle, etc.

According to a second aspect of the present invention, there is provided a method for controlling a wheel of a vehicle by means of a wheel controller, the method comprising the steps of calculating a wheel slip value for a wheel slip between a surface of the wheel and a road surface thereof; estimating a longitudinal wheel force value for a wheel force between the surface of the wheel and the road surface; generating a model representing a relationship between the calculated longitudinal wheel slip and the estimated longitudinal wheel force by using at least three longitudinal wheel force values and three corresponding longitudinal wheel slip values; and determining a wheel friction level between the surface of the wheel and the road surface thereof by means of acquiring, for a calculated wheel slip value, a longitudinal wheel force value.

Effects and features of the second aspect of the present invention are largely analogous to those described above in relation to the first aspect of the invention.

According to a third aspect of the present invention, there is provided a computer program comprising code means for performing the steps described above in relation to the second aspect when the program is run on a computer.

According to a fourth aspect of the present invention, there is provided a computer readable medium carrying the computer program described above in relation to the third aspect of the present invention.

According to a fifth aspect of the present invention, there is provided a vehicle comprising a wheel controller according to any one of the embodiments described above in relation to the first aspect of the present invention.

Effects and features of the third, fourth and fifth aspects of the present invention are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 3 is a graph illustrating an example embodiment of a model representing a relationship between the calculated longitudinal wheel slip and the estimated longitudinal wheel force for a wheel brake controller;

FIG. 4 is a graph illustrating an example embodiment of a model representing a relationship between the calculated longitudinal wheel slip and the estimated longitudinal wheel force for a wheel propulsion controller;

FIG. 5 depicts an example embodiment of a flow chart for controlling a wheel brake.

DETAILED DESCRIPTION OF EXAMPLE EMBODIMENTS OF THE INVENTION

Figure 1:
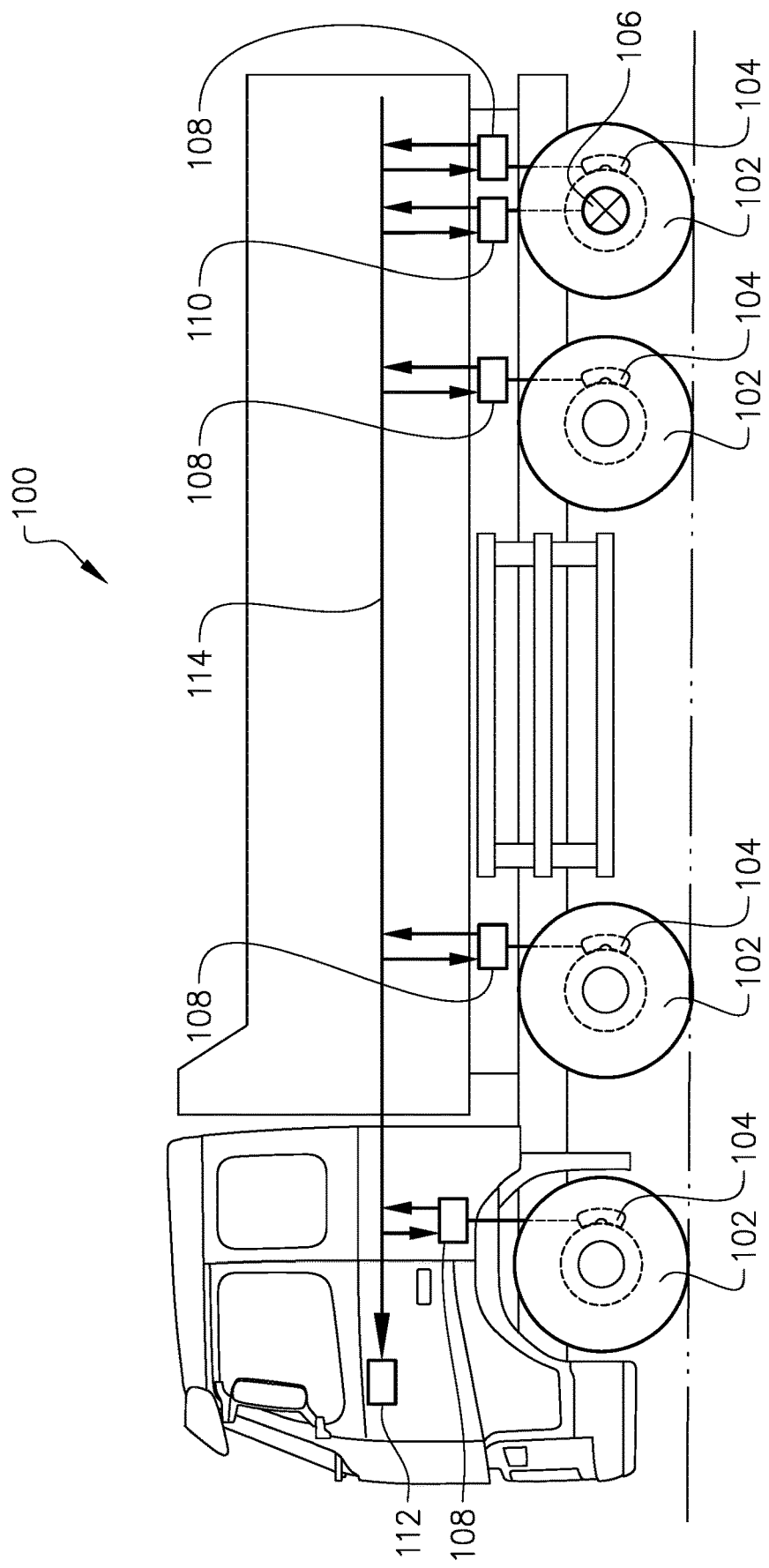
FIG. 1 is a side view of a vehicle in the form of a truck suitable for being provided with a wheel controller according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 100 in the form of a truck. The vehicle comprises a plurality of wheels 102, wherein each of the wheels 102 comprises a respective wheel brake 104. In the embodiment depicted in FIG. 1, each of the wheels 102 are provided with a wheel brake 104. It should however be readily understood that e.g. one pair of wheels 102 may be arranged without such a wheel brake 104. Also, within the scope of the present invention, the wheel brakes 104 may be a drum brake arrangement or a disc brake arrangement, etc.

Furthermore, the vehicle 100 comprises a wheel propulsion device 106 arranged to propel the wheels 104 of the vehicle 100. In the embodiment depicted in FIG. 1, only the rearmost wheel 104 is provided with a wheel propulsion device 106. However, each of the wheels 102, or a selected number of wheels 102 may be provided with a wheel propulsion device 106. The wheel propulsion device 106 may preferably be an electric motor/machine.

Moreover, each of the wheel brakes 104 is connected to a respective decentralized wheel brake controller 108 arranged for controlling operation of the wheel brake 104. Likewise, the wheel propulsion device 106 is connected to a decentralized wheel propulsion controller 110 arranged to control operation thereof. It should however be readily understood that the vehicle may utilize a combined decentralized wheel brake and propulsion controller. Hereby, the below described tire model generator 216 can be generated for both the wheel brake 104 as well as for the wheel propulsion device 106, i.e. combined decentralized wheel brake and propulsion controller can generate the model during both braking and during propulsion, which may generate a more accurate model 300, 400 representing the relationship between the calculated longitudinal wheel slip and the estimated longitudinal wheel force values. Each of the wheel brake controllers 108 and the wheel propulsion controller 110 are connected to a vehicle motion management controller 112 of the vehicle 100 via a data bus communication arrangement 114 or the like. Hereby, data can be transmitted between the vehicle motion management controller 112 and the wheel brake controllers 108 and the wheel propulsion controller 110 which will be described further below.

Figure 2:
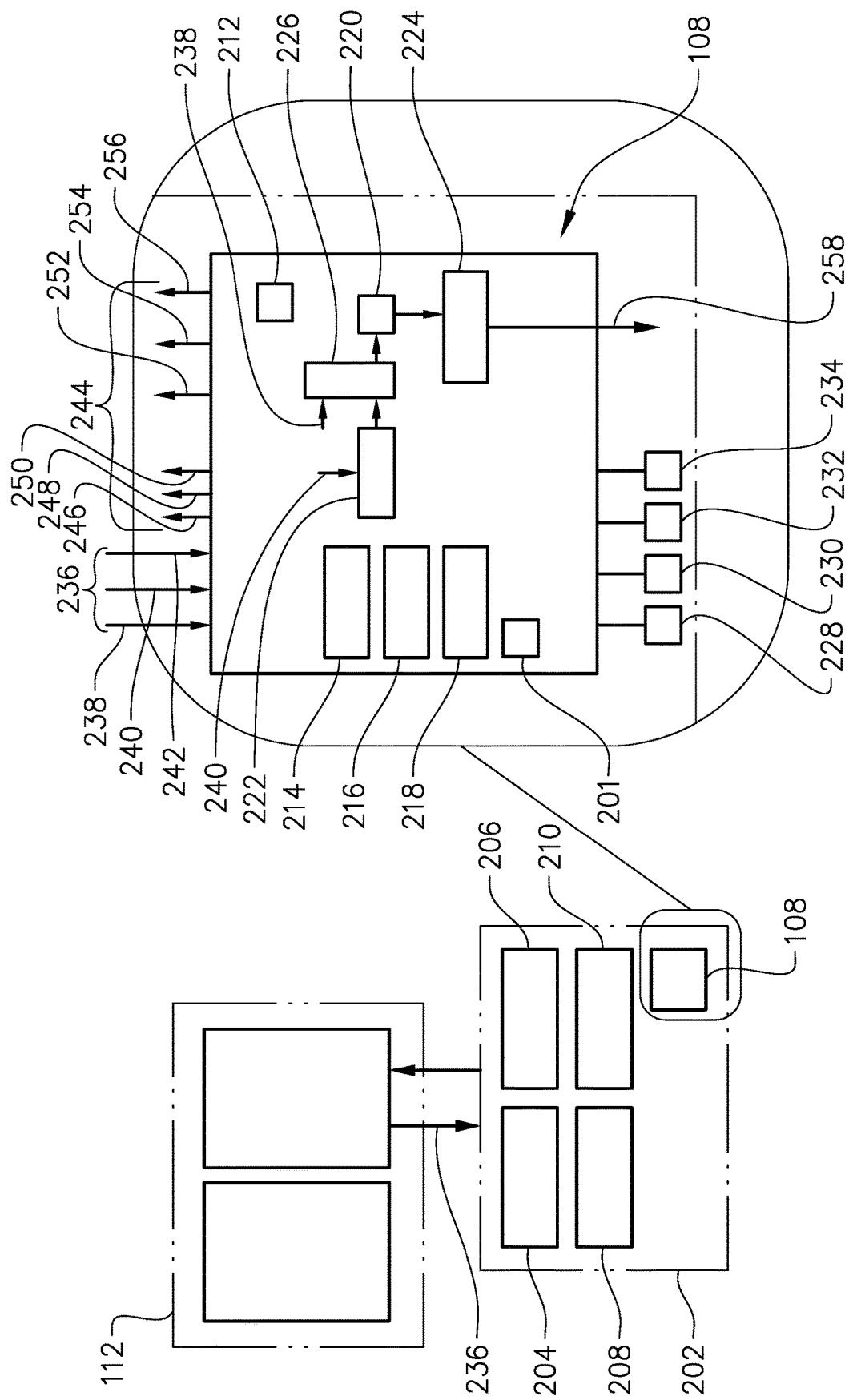
FIG. 2 illustrates a wheel brake controller according to an example embodiment of the present invention.

Reference is now made to FIG. 2 which illustrates an example embodiment of a wheel controller 108, which in the example embodiment is a decentralized wheel brake controller 108 for one of the wheels 102 of the vehicle 100, and its connection to the vehicle motion management controller 112. As depicted, the wheel brake controller 108 forms part of a vehicle motion support management arrangement 202 comprising e.g. a steering control system 204, an engine control system 206, a transmission control system 208, an auxiliary brake control system 210, etc. The additional systems of the vehicle motion support management arrangement 202 will however not be described further.

As depicted in FIG. 2, the decentralized wheel brake controller 108 comprises a wheel slip calculation module 212, a wheel force estimation module 214, a tire model generator 216, and a vehicle wheel capability module 218. The vehicle wheel capability module 218 is in the example embodiment a vehicle wheel brake capability module. If the wheel controller is a wheel propulsion controller, then the vehicle wheel capability module 218 is a wheel propulsion capability module arranged to determine the capability of the wheel propulsion device 106. The decentralized wheel brake controller 108 further comprises a wheel brake torque control module 220, a wheel slip control module 222, a wheel brake pressure control module 224 and a brake torque demand module 226.

Furthermore, the decentralized wheel brake controller 108 comprises a plurality of sensors for detecting various parameters relating to the wheel brake 104 of the vehicle 100. In particular, the decentralized wheel brake controller 108 comprises a wheel speed sensor 228, a brake temperature sensor 230, a brake wear sensor 232 and a brake pressure sensor 234. Other suitable sensors can also be provided to the decentralized wheel brake controller 108.

The decentralized wheel brake controller 108 is further arranged to receive input parameter values 236 from the vehicle motion management controller 112, which input parameter values 236 may, for example, relate to a desired brake torque demand 238 from an operator of the vehicle, a maximum allowable wheel slip limit 240 and a longitudinal speed 242 of the vehicle 100 at the specific wheel. The decentralized wheel brake controller 108 is also arranged to provide wheel brake output parameter values 244, which wheel brake output parameter values may, for example, relate to an actual wheel brake torque 246 provided to the wheel brake, a torque capability signal 248, a longitudinal wheel velocity signal 250, a signal relating to an estimation of a time period until the wheel brake 104 is overheated 252, a signal relating to an estimation of brake pad wear 254 of the wheel brake 102, and a signal relating to a determined/estimated parameter value 256 of the friction between the surface of the wheel 102 and the road surface. The actual wheel brake torque 246 corresponds to the actual instantaneous brake force generated between the surface of the wheel and the road surface multiplied by the radius of the wheel. This is thus not necessarily the same as an applied brake torque. By generating the signal relating to the actual brake torque 246 calculated as described above, further accuracy in determining the actual brake torque can be provided. Also, the decentralized wheel brake controller 108 is also arranged to output a control signal 258 for controlling the respective wheel brake actuators (not shown).

Now, the various modules of the decentralized wheel brake controller 108 will be described in further detail.

The wheel slip calculation module 212 is arranged to calculate a longitudinal wheel slip value for the wheel slip between the surface of the wheel 102 and the road surface. The wheel slip calculation module 212 is also arranged to provide the calculated wheel slip value to other components/modules of the decentralized wheel brake controller 108. The wheel slip is calculated for a braking event by the formula given in Equation 1, while the wheel slip is calculated for a propulsion event by the formula given in Equation 1':

$$\lambda = \frac{v_x - \omega R}{v_x} \qquad \text{Eq. 1}$$

$$\lambda = \frac{v_x - \omega R}{\omega R} \qquad \text{Eq. 1'}$$

where:

$v_x$ is the longitudinal speed of the vehicle at the specific wheel, which input is received from the vehicle motion management controller 112 as described above;

$\omega$ is the rotational speed of the wheel which is measured by the above described wheel speed sensor 228; and R is the rolling radius of the wheel.

The wheel slip control module 222 is arranged to receive a maximum allowable wheel slip limit 240 for the wheel 102, which value is received from the vehicle motion management controller 112. The wheel slip control module 222 thereafter calculates/determines a required brake pressure or brake torque required to bring the wheel 102 to a longitudinal slip value which corresponds to the maximum allowable wheel slip limit 240. A non-limiting example of a calculation for determining the required brake torque is given in Equation 2 below:

$$\tau_{sc} = RF_x - (1-\lambda)\dot{v}_x J - k\left\{\frac{\lambda - \lambda_{lim}}{|\lambda - \lambda_{lim}| + \delta}\right\} - (\lambda - \lambda_{lim})\phi \qquad \text{Eq. 2}$$

where:

$\tau_{sc}$ is the required brake torque for bringing the wheel slip to the maximum allowable wheel slip value, $\lambda_{lim}$;

$F_x$ is the longitudinal friction force acting between the surface of the wheel the road surface;

J is the rotational inertia of the wheel;

$\dot{v}_x$ is the acceleration of the vehicle, which value is received from the vehicle motion management controller 112; and k, δ, ϕ are tuneable variables, or controller gains, which are used for determining how aggressively the wheel slip control module 222 should track a slip demand.

The brake torque demand module 226 is arranged to receive the required brake torque $\tau_{sc}$ calculated by the wheel slip control module 222, and the desired brake torque demand 238 from an operator of the vehicle 100 received from the vehicle motion management controller 112. The brake torque demand module 226 then determines a brake torque demand by using a minimum value of the required brake torque $\tau_{sc}$ and the desired brake torque demand 238 from the operator. Hence, if the desired brake torque demand 238 from the operator exceeds the required brake torque $\tau_{sc}$, then the brake torque demand module 226 chooses/uses the required brake torque $\tau_{sc}$ which is the minimum of these values. Hereby, the wheel slip is prevented from exceeding the wheel slip limit.

Turning to the wheel brake torque control module 220, this module is arranged to determine a brake pressure demand based on a received signal indicative of brake torque demand. The wheel brake torque control module 220 receives a signal indicative of a present brake temperature level of the wheel brake 104. This temperature level can be an estimated brake temperature or a brake temperature value received from the brake temperature sensor 230. The wheel brake torque control module 220 can then determine how the wheel brake 104 is affected by the temperature level, i.e. how much "brake fade" being present due to the wheel brake temperature level. A brake gain can thus be calculate by the wheel brake torque control module 220, as described by Equation 3 below, wherein the brake gain is a ratio of the generated brake torque and the brake pressure applied, which brake gain is affected by the temperature level of the wheel brake 104.

$$\text{Brake gain} = \frac{\text{Generated brake torque}}{\text{Applied brake pressure}} \qquad \text{Eq. 3}$$

By means of determining the brake gain, the wheel brake torque control module 220 can adjust for the reduction due to the temperature level of the wheel brake 104 so that the desired generated brake torque is applied. Other inputs to the wheel brake torque control module 220 may, for example, be the specific type of brake chamber used, specific type of brake actuator used, etc. Hereby, a brake pressure demand signal is provided from the wheel brake torque control module 220 to the wheel brake pressure control module 224 for controlling the respective wheel brake actuators (not shown).

The wheel force estimation module 214 is arranged to estimate a longitudinal wheel force value for a wheel force between the surface of the wheel 102 and the road surface. Equation 4 below can be used when estimating the longitudinal wheel force value:

$$J\dot{\omega} - RF_x + \tau_B - \tau_P = 0 \qquad \text{Eq. 4}$$

where:

$\dot{\omega}$ is the rotational acceleration of the wheel;

$\tau_B$ is the brake torque applied to the wheel; and $\tau_P$ is the propulsion torque applied to the wheel if the wheel controller is a wheel propulsion controller.

Turning to the tire model generator 216, which tire model generator 216 is arranged to receive longitudinal wheel slip values from the wheel slip calculation module 212 and longitudinal wheel force values from the wheel force estimation module 214. Hereby, the tire model generator 216 is configured to generate a model 300, 400 representing a relationship between the calculated longitudinal wheel slip and the estimated longitudinal wheel force by using at least three longitudinal wheel force values and three corresponding longitudinal wheel slip values. Hereby, a curve representing the characteristics of the wheel 104 for a particular point in time is generated. In detail, the curve describes the friction condition between the surface of the wheel 102 and the road surface thereof, as well as mechanical properties of the wheel 102 itself. The model 300, 400 representing the relationship between the calculated longitudinal wheel slip and the estimated longitudinal wheel force is described in further detail below with reference to FIGS. 3 and 4.

Finally, turning to the vehicle wheel capability module 218, which vehicle wheel capability module 218 in the example embodiment will be denoted as a wheel brake capability module 218. The wheel brake capability module 218 is arranged to provide a signal 248 to the vehicle motion management controller 112 indicative of the current capability of the wheel brake 104, i.e. how much brake torque the wheel brake 104 is able to sustain. Thus, the vehicle motion management controller 112 receives information such that it can be updated to understand the braking performance available for each of the wheel brakes 104.

The wheel brake capability module 218 receives both a temperature value, either estimated or measured by the wheel brake temperature sensor 230, and the wheel-road friction characteristics received from the above described tire model generator 216. Hereby, a relatively instantaneous determination of maximum and minimum brake torque capability of the wheel brake 104 can be determined. For example, if the road condition is associated with a relatively high wheel friction condition between the wheel 102 and the road due to e.g. driving on dry asphalt, the brake torque capability is mainly governed by the brake actuators and their ability to provide brake torque, as well as the above described brake fade that might have occurred due to the temperature level of the wheel brake 104. On the other hand, if the road condition is associated with a relatively low wheel friction condition between the wheel and the road due to e.g. ice-formation, etc. the brake torque capability is mainly limited by the friction available between the surface of the wheel 102 and the road surface.

Moreover, the wheel brake capability module 218 is also arranged to generate an estimation regarding a time period until the wheel brake 104 is determined to be overheated, and transmit the corresponding signal 252 to the vehicle motion management controller 112. The estimated time period until overheating the wheel brake 104 is based on e.g. heat transfer within the brake actuators, which in turn can be based on the applied brake torque and/or a direct measurement from the wheel brake temperature sensor 120.

The wheel brake capability module 218 is also arranged to receive a signal from the brake wear sensor 232 for determining the current wear of the wheel brake pads, which will further improve the determination of the current/present brake torque capability of the wheel brake 104. The wheel brake capability module 218 can transmit the various signals to the vehicle motion management controller 112 or to a control unit 201 of the decentralized wheel brake controller 108.

Reference is now made to FIG. 3 which illustrates an example embodiment of the above described model 300 representing the relationship between the calculated longitudinal wheel slip and the estimated longitudinal wheel force values. The vertical axis 302 represents the friction force between the surface of the wheel 102 and the road surface, while the horizontal axis 304 represents the longitudinal wheel slip of the wheel 102.

As depicted in FIG. 3, a plurality of points 306 are indicated, which points corresponds to different calculated wheel slip values calculated by the wheel slip calculation model 212 and estimated longitudinal wheel force values estimated by the wheel force estimation module 214 corresponding to the calculated longitudinal wheel slip values. Hence, each point 306 corresponds to a longitudinal wheel slip and a longitudinal wheel force value. By means of the plurality of points 306, which should be at least three, the model 300 can be generated. The model 300 comprises a longitudinal wheel slip stiffness 308, which is measured at zero slip between wheel surface and the road surface. This longitudinal wheel slip stiffness 308 relates in general to the characteristics of the wheel 102. Further, the model 300 also comprises a maximum wheel friction level 310 and a wheel friction level 312 corresponding to a maximum wheel slip level. The maximum wheel friction level 310 and the wheel friction level 312 corresponding to a maximum wheel slip level are dynamic levels which changes based on e.g. the road conditions. Hence, if the friction between the surface of the wheel 102 and the road surface increases or decreases, the maximum wheel friction level 310 and the wheel friction level 312 corresponding to a maximum wheel slip level also increases/decreases.

Furthermore, a shape factor may be applied as an additional parameter when defining the shape of the portion of the curve representing the maximum wheel friction level 310. The shape factor may be arranged to define how detailed the peak of the curve is, and which wheel slip value that corresponds to the maximum available force. Also, when establishing the model 300, a least square method may be used for fitting the curve to the different points 306. Naturally, the more points 306 used the more accurate model 300 provided. Once the model 300 representing the relationship between the calculated longitudinal wheel slip and the estimated longitudinal wheel force values, a wheel force value can be acquired for any calculated wheel slip values.

A signal relating to the determined/estimated parameter value 256 of the friction between the surface of the wheel 102 and the road surface is provided to the vehicle motion management controller 112 for being provided with a holistic view of each of the wheel brakes 104 of the vehicle.

Turning now to FIG. 4, illustrating an example embodiment of the above described mode 400' representing the relationship between the calculated longitudinal wheel slip and the estimated longitudinal wheel force values for a wheel propulsion controller.

In FIG. 3, the friction force between the surface of the wheel 102 and the road surface, as well as the longitudinal wheel slip are represented by positive values. For the model 400 depicted in FIG. 4, the friction force between the surface of the wheel 102 and the road surface, as well as the longitudinal wheel slip are represented by negative values. The model 400 thus comprises a negative longitudinal wheel slip stiffness 408, a minimum wheel friction level 410 and a wheel friction level 412 corresponding to a minimum wheel slip level for the wheel 102.

Although FIG. 3, which relates to braking, is illustrated by positive values, and FIG. 4, which relates to propulsion, is illustrated by negative values, it should be readily understood that the signs may be arranged in the opposite way, i.e. positive signs for propulsion and negative signs for braking. Hence, FIGS. 3 and 4 are mainly for illustrating the difference between the concepts of braking and propulsion.

In order to describe an example embodiment of how to control a wheel brake by means of the decentralized wheel brake controller 108, reference is made to FIG. 5. FIG. 5 is a flow chart illustrating an example embodiment of the sequential steps of controlling the wheel brake 104 of the respective wheels 102 of the vehicle 100.

Firstly at T1, the vehicle motion management controller 112 determines a required deceleration level for reducing the speed of the vehicle at a desired level, and determines a corresponding brake torque demand required for achieving the desired deceleration rate. The vehicle motion management controller 112 provides a desired brake torque demand 238 and a maximum allowable wheel slip limit 240 to the decentralized wheel brake controller 108. At T2 the decentralized wheel brake controller 108 executes an initial brake application for the wheel brake 104 which brake application corresponds to the received brake torque demand 238. This is executed until the maximum allowable wheel slip limit 240 for the wheel 102 is reached, i.e. until the wheel slip of the wheel 102, which is calculated by the wheel slip calculation module 212 reaches the maximum allowable wheel slip limit 240 determined by the vehicle motion management controller 112. When the maximum allowable wheel slip limit 240 is reached, the wheel slip control module 222 controls the brake pressure of the wheel brake 104 so that the wheel slip does not exceed the maximum allowable wheel slip limit 240. Hence, the slip control module 222 will track the slip limit until the operator reduces the torque request. The decentralized wheel brake controller 108 then transmits a signal 248 indicative of the current capability of the wheel brake 104 to the vehicle motion management controller 112. The capability of the wheel brake 104 is estimated/determined by the above described wheel brake capability module 218. Also, the signal relating to the determined/estimated parameter value 256 of the friction between the surface of the wheel 102 and the road surface is provided to the vehicle motion management controller 112.

At T3, the vehicle motion management controller 112 uses the updated information relating to the capability 248 of the wheel brake 104 as well as the updated parameter values 256 of the friction between the surface of the wheel 102 and the road surface. Hereby, the vehicle motion management controller 112 is able to update its own internal computer model of the vehicle and optimize an allocation of the brake actuator (not shown), which in the example embodiment may result in a lower brake torque demand 238. Thus, an updated brake torque demand, which is less than or equal to the magnitude of the capability of the wheel brake, is transmitted to the decentralized wheel brake controller 108.

The decentralized wheel brake controller 108 thus receives the updated brake torque demand from the vehicle motion management controller 112. Hereby, the decentralized wheel brake controller 108 at T4 adjusts the brake torque to the new demand value 238, calculates an updated wheel slip value and determines an updated capability of the wheel brake 104. The decentralized wheel brake controller 108 then transmits the updated determined capability of the wheel brake 104, as well as a determination of the time period until the wheel brake is about to overheat, to the vehicle motion management controller 112. The vehicle motion management 112 then at T5 determines brake torque demands etc. for the various wheel brakes of the vehicle 100. For example, if the time period until the wheel brakes is determined to overheat is relatively low, the vehicle motion management 112 may reallocate the brake pressure demand to other wheel brakes 104, i.e. may control other decentralized wheel brake controllers to increase their brake torque.

Figure 6:
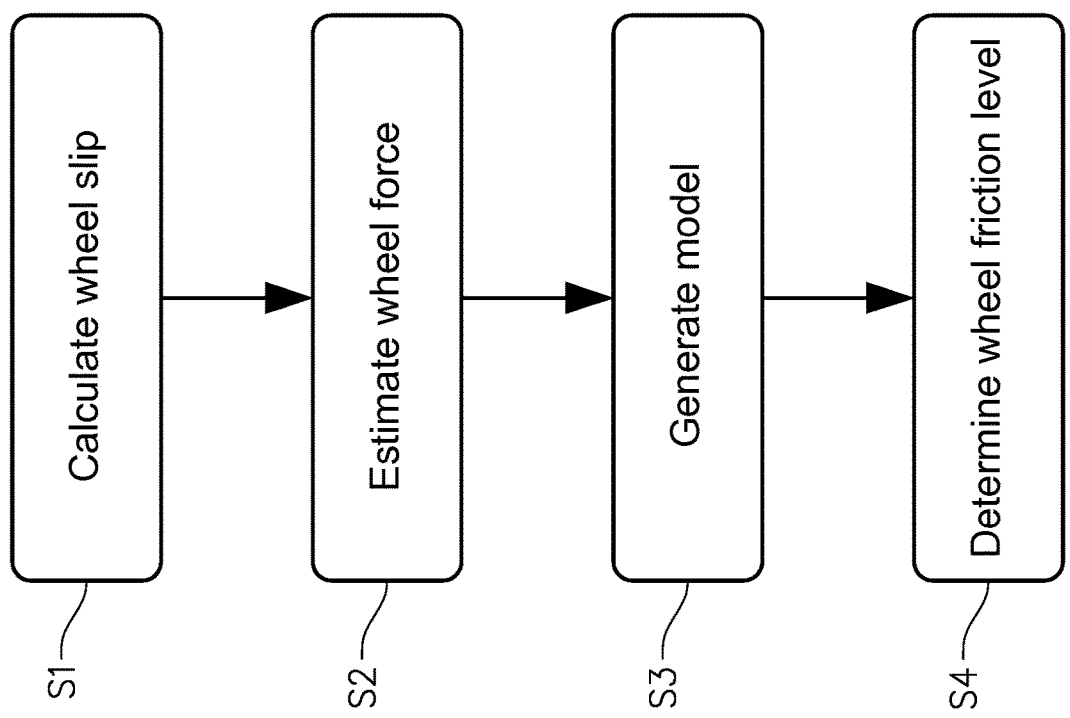
FIG. 6 is an example embodiment of a flow chart for controlling a wheel of the vehicle.

Now, reference is made to FIG. 6 which is an example embodiment of a flow chart for controlling a wheel 102 of the vehicle 100. Firstly, the wheel slip calculation module 212 calculates S1 a wheel slip value for a wheel slip between a surface of the wheel 102 and a road surface thereof. The calculation is preferably executed as described above in relation to FIG. 2. Furthermore, the wheel force estimation module 214 estimates S2 a longitudinal wheel force value for a wheel force between the surface of the wheel 102 and a road surface thereof. By means of at least three calculated wheel slip values and three corresponding estimated longitudinal wheel force values, a model representing a relationship between wheel slip and the longitudinal force is generated S3. Finally, a wheel friction level between the surface of the wheel 102 and the road surface thereof can be determined S4 by means of acquiring, for a calculated wheel slip value, a longitudinal wheel force value from the model.

It is to be understood that the present invention is not limited to the embodiment described above and illustrated in the drawings; rather, the skilled person will recognize that many changes and modifications may be made within the scope of the appended claims. Although the above description has been mainly relating to a wheel brake controller, the invention is equally applicable for a wheel propulsion controller.

The invention claimed is:

1. A decentralized wheel controller arranged in connection to a wheel of a vehicle, comprising:
   a wheel slip calculation module arranged to calculate a longitudinal wheel slip value for a wheel slip between a surface of the wheel and a road surface thereof;
   a wheel force estimation module arranged to estimate a longitudinal wheel force value for a wheel force between the surface of the wheel and the road surface;
   a tire model generator arranged to receive longitudinal wheel slip values from the wheel slip calculation module and longitudinal wheel force values from the wheel force estimation module;
   said tire model generator being configured to generate a model representing a relationship between the calculated longitudinal wheel slip and the estimated longitudinal wheel force by using at least three longitudinal wheel force values and three corresponding longitudinal wheel slip values, wherein the model representing the relationship between the calculated longitudinal wheel slip and the estimated longitudinal wheel force comprises a longitudinal wheel slip stiffness measured at zero slip between wheel surface and the road surface, an absolute maximum wheel friction level, and a wheel friction level corresponding to a maximum wheel slip level; and
   a vehicle wheel capability module arranged in communication with the tire model generator, said vehicle wheel capability module being configured to determine an absolute maximum wheel friction level between the surface of the wheel and the road surface thereof by means of acquiring, for a calculated wheel slip value, a longitudinal wheel force value from the model of the tire model generator.

2. The wheel controller according to claim 1, further comprising a control unit arranged to receive a signal from the tire model generator and/or the vehicle wheel capability module, wherein the control unit is arranged in communication with a vehicle motion management controller of the vehicle for communication of said signals thereto.

3. The wheel controller according to claim 1, wherein the wheel controller is a wheel brake controller and said vehicle wheel capability module is a wheel brake capability module arranged to determine the capability of a wheel brake.

4. The wheel controller according to claim 3, further comprising a brake temperature sensor arranged to measure a temperature of the wheel brake.

5. The wheel controller according to claim 3, further comprising a brake wear sensor arranged to measure a current wear value of the wheel brake.

6. The wheel controller according to claim 3, further comprising a brake pressure sensor arranged to measure a current brake pressure of the wheel brake.

7. The wheel controller according to claim 3, wherein the vehicle wheel capability module is further arranged to determine a time period until said wheel brake is overheated.

8. The wheel controller according to claim 3, wherein the vehicle wheel capability module is further arranged to receive a current wear value of the wheel brake from the brake wear sensor and to use the current wear value when determining the capability of the wheel brake.

9. The wheel controller according to claim 3, further comprising a wheel brake torque control module, said wheel brake torque control module being arranged to receive a signal indicative of a brake torque demand and to determine, based on said received signal, a brake pressure demand.

10. The wheel controller according to claim 9, wherein the wheel brake torque control module is further configured to receive a signal indicative of a brake temperature level of the wheel brake, wherein the brake temperature level is used as input when determining said brake pressure demand.

11. The wheel controller according to claim 10, wherein the signal indicative of a brake temperature level of the wheel brake is an estimated brake temperature or a brake temperature value received from a brake temperature sensor.

12. The wheel controller according to claim 1, wherein the wheel controller is a wheel propulsion controller and said wheel capability module is a wheel propulsion capability module arranged to determine the capability of a wheel propulsion device.

13. The wheel controller according to claim 12, wherein the vehicle wheel capability module is further arranged to determine a time period until said wheel propulsion device is overheated.

14. The wheel controller according to claim 1, further comprising a wheel speed sensor arranged to measure a speed of the wheel.

15. The wheel controller according to claim 1, further comprising a wheel slip control module, said wheel slip control module being arranged to receive a maximum allowable wheel slip value for the wheel and to control the wheel slip of the wheel not to exceed the maximum allowable wheel slip value.

16. The wheel controller of claim 1 wherein the wheel controller is provided in a vehicle.

17. A method for controlling a wheel of a vehicle by means of a decentralized wheel controller arranged in connection to a wheel of a vehicle, the method comprising the steps of:
calculating a wheel slip value for a wheel slip between a surface of the wheel and a road surface thereof;
estimating a longitudinal wheel force value for a wheel force between the surface of the wheel and the road surface;
generating a model representing a relationship between the calculated longitudinal wheel slip and the estimated longitudinal wheel force by using at least three longitudinal wheel force values and three corresponding longitudinal wheel slip values, wherein the model representing the relationship between the calculated longitudinal wheel slip and the estimated longitudinal wheel force comprises a longitudinal wheel slip stiffness measured at zero slip between wheel surface and the road surface, an absolute maximum wheel friction level, and a wheel friction level corresponding to a maximum wheel slip level; and
determining a wheel friction level between the surface of the wheel and the road surface thereof by means of acquiring, for a calculated wheel slip value, a longitudinal wheel force value from the model.

* * * * *